United States Patent [19]
Dean

[11] 3,877,389
[45] Apr. 15, 1975

[54] STABILIZING ROLL CONTROL FOR PNEUMATIC SPRING RAILWAY CAR

[75] Inventor: Albert G. Dean, Narberth, Pa.

[73] Assignee: The Budd Company, Philadelphia, Pa.

[22] Filed: Feb. 19, 1974

[21] Appl. No.: 443,537

[52] U.S. Cl........... 105/158 R; 105/171; 105/199 A; 105/201; 105/340; 105/453; B61f/5/52
[51] Int. Cl............................. B61f 1/14; B61f 5/08
[58] Field of Search............ 105/4 R, 157 R, 158 R, 105/164, 175 A, 182 R, 199 R, 210, 340, 171, 199 A, 201, 453

[56] References Cited
UNITED STATES PATENTS

| | | | |
|---|---|---|---|
| 2,252,789 | 8/1941 | Van Dorn | 105/4 R |
| 2,811,932 | 11/1957 | Clary | 105/340 |
| 2,899,911 | 8/1959 | Lich | 105/182 R X |
| 2,908,230 | 10/1959 | Dean | 105/182 R |
| 3,548,755 | 12/1970 | Lich | 105/199 R |

Primary Examiner—Wood, Jr. M. Henson
Assistant Examiner—Howard Beltran

[57] ABSTRACT

This application discloses lateral roll control means for railway vehicles, especially for high-level double-deck passenger cars, such as are shown in U.S. Pat. No. 2,811,832 Clary, Nov. 5, 1957, and those using light-weight trucks, as of the "Pioneer" type disclosed in U.S. Pat. No. 2,908,230, W. B. Dean, Oct. 13, 1959, and comprises specially designed spring means between the truck bolster and car bolster which allows considerable lateral movement, together with auxiliary means for restraining lateral roll movement, said roll restraint means being located above the car bolster or floor over the trucks and upward toward the center of gravity (C.G.) of the car.

3 Claims, 3 Drawing Figures

PATENTED APR 15 1975 3,877,389

STABILIZING ROLL CONTROL FOR PNEUMATIC SPRING RAILWAY CAR

BACKGROUND OF INVENTION

There are two lateral motion problems which have to be considered in connection with railway passenger cars. One is an overturning tendency of the car and truck as a unit relative to the rails; the other is a rolling tendency of the car body on its trucks.

It will be assumed that the trucks will be suitable for adequately resisting the overturning tendency. The rolling tendency of the car on the trucks, however, can cause considerable difficulty, especially with high-level double-deck cars, and more especially at the very high speeds now desired for railway travel. Right-of-way clearances are limited and the higher the car the greater the distance of lean-out at the top. With modern wide double-deck cars, the lean-out may be as much as 6 inches or more either way from center position and it is desirable to restrain the roll to keep the car sides within permissible limits and also improve the ride.

It is possible to design car trucks which will adequately restrain car roll but the construction becomes heavy, stiff and expensive.

Many trucks are suitable for low-level cars, even at high speeds, but their lateral restraints are not suitable for high-level cars at high speeds. The means on the truck which resists lateral movement is partly provided by lateral stiffness in the air springs between the truck and car bolsters, and partly by means on the truck located below the car bolster, a position which is too low to provide the desired lateral restraint for high-level cars.

There have been numerous proposals for compensating for car roll, especially on banked curves, but so far as is known, none of the proposals is similar to the present arrangement.

SUMMARY OF INVENTION

According to the present invention, the vertical support spring means is altered to provide reduced lateral restraint, as compared to the usual stiff braced air springs previously used. Auxiliary lateral restraint means are provided above the car bolster, up toward the center of gravity (C.G.) of the car, for controllably limiting the lateral movement or roll of the car.

As herein disclosed, rigid upwardly extending projection means are provided on the truck bolster and car bolster or frame. Between the upper ends of these projection means there are disposed controllable resilient means, such as air spring means, together with swingable connecting means, for restraining the lateral movement and roll of the car body on the trucks. One type of double-deck car, such as that shown in the Clary patent, provides space above the car bolster and below the upper deck floor wherein the lateral restraint means may be located.

DRAWINGS

The objects of the invention, as well as various features of novelty and advantages, will be apparent from the following description of an exemplary embodiment, reference being made to the accompanying drawings thereof, wherein.

SPECIFIC EMBODIMENT

Figures 1, 2, 3:
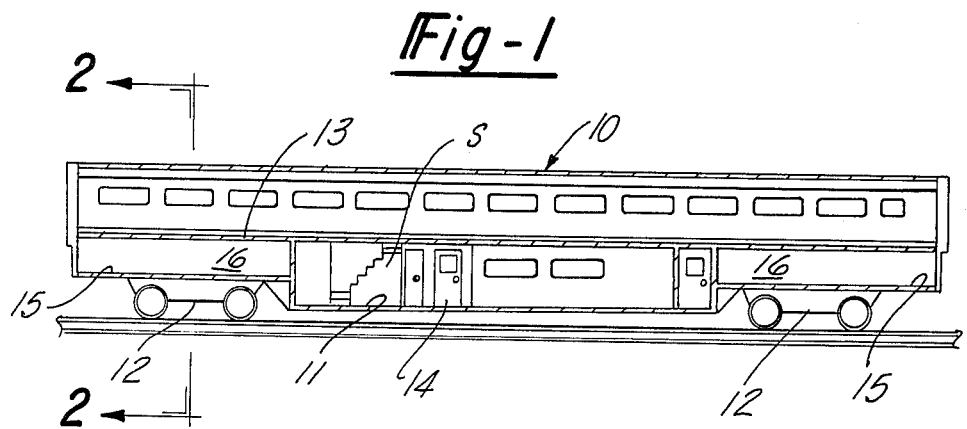
FIG. 1 is a side elevation of one type of double-deck car suitable for the application of roll control means of the present invention.
FIG. 2 is a vertical transverse section taken on the line 2—2 of FIG. 1.
FIG. 3 is an enlarged vertical transverse section on about the same plane as FIG. 2, showing the roll control means of the present invention applied.

Referring to the drawings, a car 10 is of the high-level double-deck type including a body with a frame. The car 10 includes a low-level floor 11 between trucks 12 and a high-level upper-deck floor 13. There are side entrance doors 14 to the lower deck floor. Interiorly there are passage stairs S between floors 11 and 13. At the ends of the car, there may be additional stairs, not illustrated, from the upper floor to the inter-car level passages between cars of normal level. Or, for cars which will be operated together in full trains of high-level cars, the end stairs may be omitted, using high-floor-level passage between cars.

At the ends over the trucks 12 there are intermediate-height car frame floor base components 15 below the upper floor 13, leaving spaces 16 which are usefully employed for purposes of the present invention. The car above its truck supports has a center of gravity (C.G.) somewhere near the level of the upper floor 13.

The truck has side frames 20, wheel-axle units 22, a bolster 23 turnably supported on the tops of the side frames, and spring means 24 supporting a bolster 25 of the car underframe in the intermediate-height portion 16.

For low-level cars, the type for which this type of truck has mainly been used heretofore, the spring means 24 has comprised air springs having considerable lateral rigidity with transverse lateral movement being limited by suitable means.

According to the present invention, which adapts this type of truck to high-level car use, the air spring means 24 has been altered to provide more ample transverse movement so the base of the car can shift transversely more than usual relative to the truck bolster to reduce forced tilting movements of the car body. Instead of using a single air spring unit at each end of the car bolster, there is used a composite spring unit comprising an upper air spring element 24.1 and another spring element 24.2 which has little lateral rigidity. The other or auxiliary spring element may be a rubber block, coil spring, or other suitable known means, being illustraed as a coil spring. The lower spring element 24.2 is supported upon a tiltable base member 24.3 so that the entire spring unit may have a certain amount of tilting movement.

It is desirable, especially for high-speed trains, to avoid noise and displacement of parts in case of air spring failure. For this eventuality, which might lead to accidents or passenger apprehension at very high speeds presently contemplated, the inner portions of the air spring elements are made quite shallow vertically for the seats of the spring elements 24.2 and the end seats for the air spring elements 24.1. By this arrangement, if an air spring element fails the other spring element will not move far vertically before it finds firm support.

The present invention also provides means for resisting the transverse lateral roll movement of the car body relative to the truck and this transverse roll restraint means is located above the car bolster 25 to have effective action up toward the level of the center of gravity (C.G.) of the car body to minimize the roll moment.

As shown, the car bolster 25 at about its mid-length is provided with rigid upstanding projection means 30 and the truck bolster 23 is provided with rigid upstanding projection means 31. All the upstanding projection means 31 have their upper ends disposed at about the same elevation and below the C.G. level of the car body. It will be understood that the car bolster will be so formed as to allow the bolster projections to extend freely without obstructing relative movements, this being necessary since the car bolster is disposed directly above the truck bolster.

As illustrated, there is a single projection member at the center of the car bolster and two projection members spaced apart from the center on the truck bolster but the arrangement could be reversed.

The lateral roll constraint means between the upstanding projection means 31 shown herein comprises lateral connecting bar links 32, having first ends pivoted at 33, as by elastomeric elements. The other ends of the links 32 are connected to the upstanding projection member 30 which includes yieldable means, illustrated as being air springs 34. There may be a pivot connection at the air spring ends; or the air springs themselves may provide the necessary turning movement here.

When air springs are used for lateral roll control the lateral restraint can be varied as desired, even while running.

As an example of the application of the invention, the lateral roll control means for one model of double-deck car may be located 30 inches below the C.G. of the car. For a normal low-level car the lateral restraint means (on the truck) is located about 36 inches below the C.G. of the car. The roll moment of a car is the lateral acceleration times this displacement distance between the C.G. and the elevation of the restraint means, hence it can be seen that the present arrangement provides somewhat better roll control for double-deck cars than is usually possible for low-level cars. The displacement distance by the present arrangement can be varied as desired; whereas the roll control means, when it must be located below the car floor, can have only limited variation.

Bumpers 35 may be used to limit the extreme movements of the air springs 34.

The present lateral roll control means eliminates lateral radius rods and bumpers previously used at the truck springs, using instead a construction which minimizes lateral restraint of the supporting means, rocker spring supports being shown, as one means, for this purpose.

It is thus seen that the invention provides simple and effective means for controlling lateral roll of double-deck high-level cars, using space between floor levels which previously was wasted or used for storage or other non-passenger use.

While one embodiment of the invention has been described for purposes of illustration, it is to be understood that there may be various embodiments and modifications within the scope of the invention.

I claim:

1. Lateral roll control means for railway cars mounted on trucks, comprising in combination, truck bolster means, car body bolster means disposed above said truck bolster means for carrying a car body frame, resilient support means for the car body frame between the body bolster means and said truck bolster means, and resilient lateral restraint means between the body bolster means of said car body frame and truck bolster means located above the said car body bolster means, said lateral restraint means including air spring means, a connecting rod and supplemental resilient spring support means connected in series with each other between said truck bolster means and said car body bolster means to control the lateral roll movement of said car body frame on said truck bolster means.

2. Lateral roll control means for railway cars as set forth in claim 1, which further comprises rigid upstanding projection means on said truck bolster means and said car bolster means and carrying said lateral restraint means at the upper ends.

3. In combination, a double-deck high-level type car with a low floor between end trucks, a full-length upper floor, and a chamber between car bolsters over the trucks and beneath the upper floor, lateral roll restraint means located in the chamber below the upper floor near the level of the center of gravity of the car, truck bolster means, car body bolster means disposed above said truck bolster means for carrying a car body frame, resilient support means for the car body frame between said body bolster and said truck bolster means, and resilient lateral restraint means between said body bolster of said car body frame and said truck bolster means located above the said car body bolster means, said lateral restraint means including air spring means, a connecting rod and supplemental resilient spring support means connected in series with each other between said truck and said body bolster to control lateral movement of said car body on said bolster means.

* * * * *